United States Patent [19]

Cuneo

[11] 4,442,366

[45] Apr. 10, 1984

[54] SWITCH-PLUG MODULE FOR PORTABLE ELECTRIC TOOL

[75] Inventor: Giuseppe Cuneo, Gattorna, Italy

[73] Assignee: Black & Decker Inc., Newark, Del.

[21] Appl. No.: 353,918

[22] Filed: Mar. 2, 1982

[30] Foreign Application Priority Data

Mar. 4, 1981 [IT] Italy .............................. 20969/81[U]

[51] Int. Cl.[3] .............................................. H02K 7/14

[52] U.S. Cl. ....................................... 310/50; 310/71; 339/58

[58] Field of Search ........... 339/154 R, 154 A, 166 R, 339/170, 147, 58; 200/307; 310/47, 48, 50, 68 A, 71, 89

[56] References Cited

U.S. PATENT DOCUMENTS

| | | | |
|---|---|---|---|
| 2,513,271 | 7/1950 | Bluemink et al. | 310/50 |
| 2,860,201 | 11/1958 | Conord | 339/58 |
| 2,955,183 | 10/1960 | Beach . | |
| 2,975,391 | 3/1961 | Beede et al. | 339/91 |
| 3,054,994 | 9/1962 | Haram | 339/147 P |
| 3,843,224 | 10/1974 | Gerke et al. | 339/58 |
| 4,104,606 | 8/1978 | DeWitt | 200/307 |

FOREIGN PATENT DOCUMENTS

| | | |
|---|---|---|
| 679874 | 9/1952 | United Kingdom . |
| 1119110 | 7/1968 | United Kingdom . |

*Primary Examiner*—J. D. Miller
*Assistant Examiner*—D. L. Rebsch
*Attorney, Agent, or Firm*—E. D. Murphy; Walter Ottesen; Harold Weinstein

[57] ABSTRACT

A portable electric tool has a housing, an electric motor energized by a trigger-actuated switch, and a receptacle recessed in the housing. Terminals of the switch are formed as plug prongs which extend outwardly directly from the switch housing into the receptacle for receiving the female connector of a power supply cable. Preferably, a second set of plug prongs extend forwardly from the switch housing and receive a female connector of a motor cable. This arrangement enables wiring connections to the switch from the supply cable to be eliminated.

4 Claims, 3 Drawing Figures

SWITCH-PLUG MODULE FOR PORTABLE ELECTRIC TOOL

FIELD OF THE INVENTION

This invention relates to portable electric tools, such as drills, sanders, honing devices, etc., and improved switching arrangements therein.

BACKGROUND OF THE INVENTION

Portable electric tools are usually operated by a trigger-actuated switch mounted in the handle of the tool.

It is well known for such tools to have a relatively short cable extending therefrom and having a plug at the free end thereof for connection to a source of power supply. The other end of the cable passes into the interior of the tool and the wire ends are fastened to screw terminals of the trigger-switch.

It is also known to provide such tools with a receptacle recessed in the handle and having therein blade-like plug prongs connected with an intermediate terminal board arrangement embodied within the tool and from which internal wires are connected to screw-type terminals of the switch. A cord set for connection to a source of power supply at one end, has at the other end a female connector that is inserted into the handle receptacle to electrically engage the plug prongs therein. Such an arrangement is disclosed more fully in U.S. Pat. No. 3,843,224.

With both the above prior art arrangements, the internal wiring connections that are necessary take time and complicate assembly of the power tools.

SUMMARY OF THE INVENTION

It is an object of the present invention to provide a portable electric tool having a switch that enables the power tool to be assembled simpler and faster.

A feature of the invention by which this is achieved is the provision of plug prongs on the switch itself for receiving directly the female connector of a cord set. This has the advantage of eliminating wiring connections to the switch for the supply cable.

Accordingly, therefore, there is provided by the present invention, a portable electric tool having a housing, an electric motor energized by a trigger-actuated switch, and a receptacle recessed in the housing containing plug prongs for receiving the female connectors of a power supply cable, wherein the plug prongs are formed as terminals of the switch and extend outwardly directly therefrom.

Other objects, features and advantages of the present invention will become more fully apparent from the following detailed description of the preferred embodiment, the appended claims, and the accompanying drawings.

DETAILED DESCRIPTION OF THE PREFERRED EMBODIMENT

Figure 1:
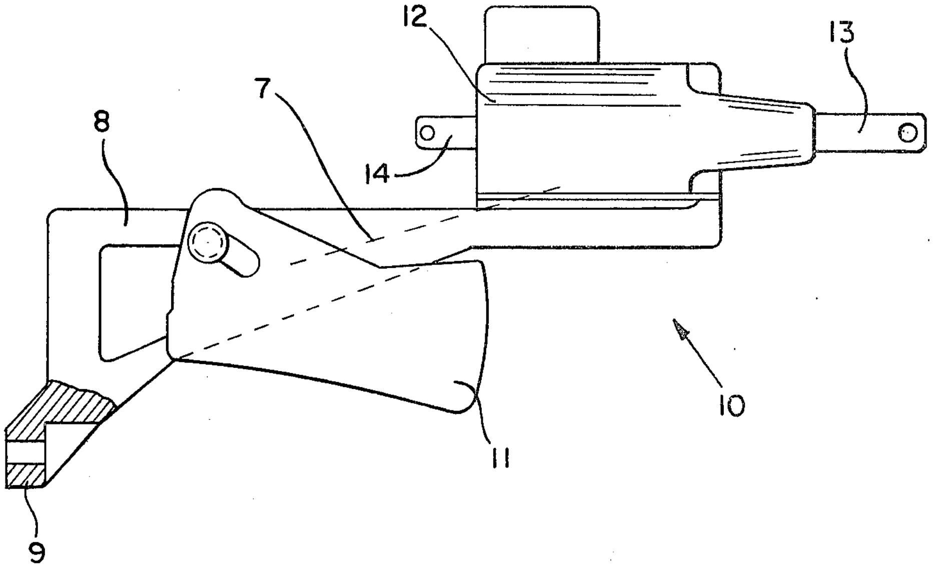
FIG. 1 is a side elevational view, in the direction of the arrow F in FIG. 2, of a trigger-actuated switch of the invention.

FIG. 1 shows a trigger-actuated switch, indicated generally by the reference numeral 10, containing a contact-breaking mechanism (not shown) actuated by a manually operable trigger 11 through a mechanical connection shown schematically by a broken line 7. The contact-breaking mechanism and the actuation thereof by the trigger 11 are well known to those skilled in the portable electric tool art and will not be further described. The switch housing 12 and the trigger 11 are mounted on a supporting structure 8 in known manner having a lug 9 (shown is section) at the lower forward end for attaching the switch 10 to a portable tool. A pair of plug prongs 13 (only one of which can be seen in FIG. 1), in the form of flat blades, extend directly rearwardly from the switch housing 12, and constitute the terminals by which the switch 10 is connected to an external power supply. Another pair of smaller prongs 14 (only one of which can be seen in FIG. 1) in the form of flat blades extend forwardly from the opposite end of the switch housing 12 and constitute the terminals by which the switch 10 is connected to the electric motor of the portable tool.

Figure 2:
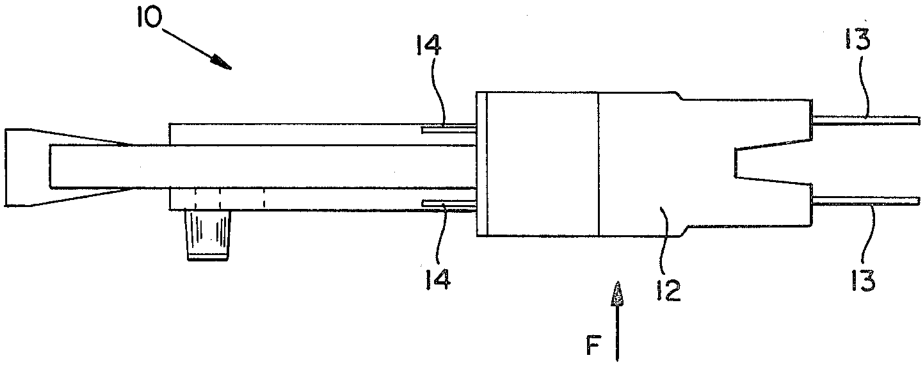
FIG. 2 is a top plan view of the switch of FIG. 1.

FIG. 2 clearly shows the pair of power supply connection prongs 13 extending rearwardly and the pair of motor connection prongs 14 extending forwardly from the switch housing 12.

Figure 3:
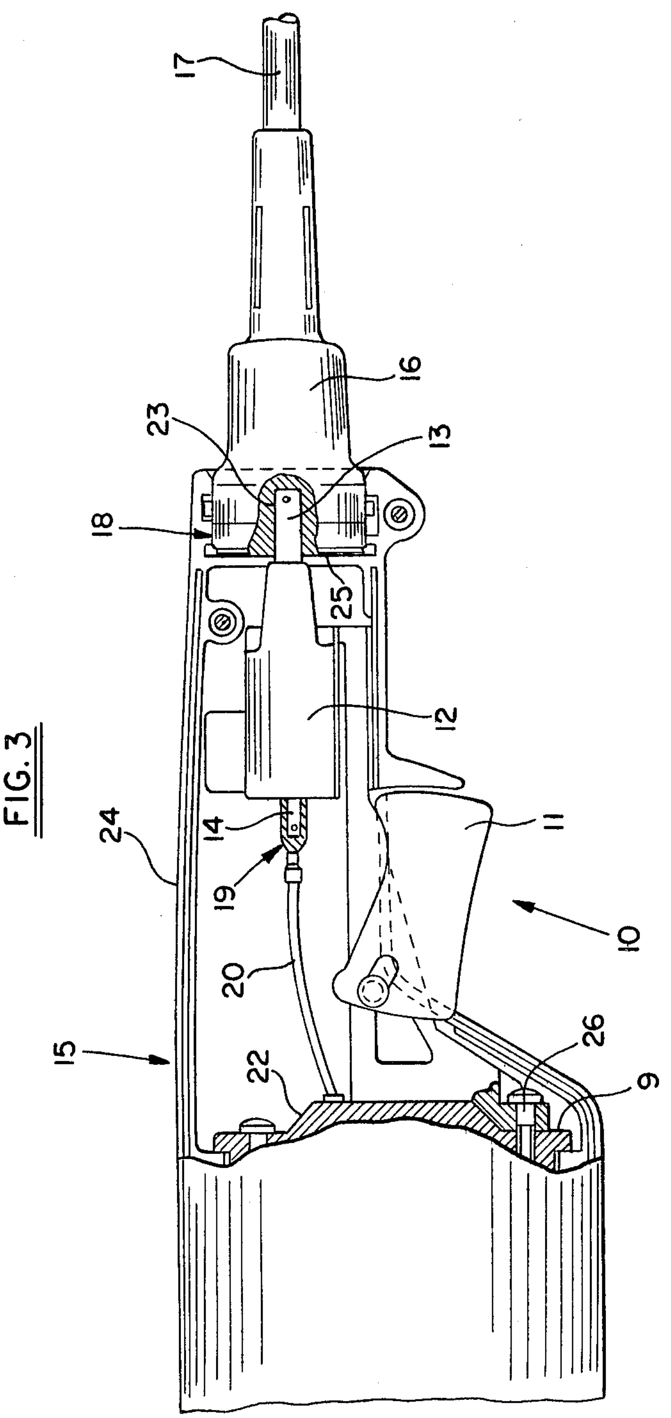
FIG. 3 is a fragmentary side elevation of a portable electric tool, partly broken away to show the incorporation of the trigger-actuated switch of FIG. 1 in accordance with the invention.

FIG. 3 shows part of the housing 15 of a portable sander containing an electric motor 22, and having a rearwardly extending handle 24. The rear end of the handle 24 has a receptacle 18 recessed therein and separated from the interior of the handle 24 by a partition 25. The switch 10 is mounted in the handle 24 with a screw 26 attaching the lug 9 to the rear end of the motor 22. An internal motor cable 20, containing the motor leads, extends rearwardly from the motor 22 and terminates in a female connector 19 which is slidably engaged on the forward terminal prongs 14 of the switch housing 12. The rear terminal prongs 13 extend outwardly from the switch housing 12, through the partition 25 into the receptacle 18. A female connector 16 of an external power supply cable 17 is inserted in the receptacle 18 with the flat prongs 13 engaging completely in corresponding slots 23 in the connector 16.

In use, after the power supply cable connector 16 has been inserted in the receptacle 18, the sander is operated by manually squeezing the trigger 11 to close the contacts in the switch housing 12 and so energize the motor 22.

The direct coupling between the connector 16 and the switch 10 contributes to simpler and faster connection of the power supply cable 17. Moreover, such a coupling is highly reliable against short-circuit hazards.

During assembly of the portable tool, the switch 10 is simply secured to the motor 22 by the screw 26, the motor cable connector 19 inserted on the prongs 14, and then the complete motor and switch unit placed in a clamshell half of the tool housing 15, no further electrical connections being necessary. It will be appreciated that this simplifies assembly of the tool so reducing production time and cost.

The above described embodiment, of course, is not to be construed as limiting the breadth of the present invention. Modifications, and other alternative constructions, will be apparent which are within the spirit and scope of the invention as defined in the appended claims.

What is claimed is:

1. A portable electric tool, comprising:

a tool housing having a handle depending rearwardly therefrom with a receptacle recessed in the rear of the handle for receiving a female connector of a cord set therein, said receptacle being separated from the interior of the handle by a partition;

an electric motor contained in said tool housing and having a cable, comprising the leads of the motor, extending rearwardly therefrom and terminating in a female connector;

an elongate support structure having a lug at the forward end thereof and being attached to said motor by a screw passing through said lug into the rear end of the motor;

a trigger-actuated switch having a trigger and a switch housing, the switch housing being mounted at the rear end of said support structure, and the trigger being mounted on said support structure intermediate the length thereof between said lug and the switch housing; and said switch housing having two sets of plug prongs extending outwardly therefrom in opposite directions, one set extending forwardly and engaging in the female connector of said motor cable, and the other set extending rearwardly through said partition into said receptacle for engagement by the female connector of said cord set when received therein;

whereby said support structure, trigger and switch housing form a sub-assembly which during assembly of the portable electric tool is simply secured to the motor by said screw and the female connector of the motor cable inserted on said forwardly extending set of plug prongs.

2. The portable electric tool of claim 1, wherein said lug is at the lower forward end of said support structure.

3. The portable electric tool of claim 2, wherein each set of plug prongs comprises a pair of flat blades.

4. The portable electric tool of claim 3 wherein said tool is a sander.

* * * * *